Figure 1:
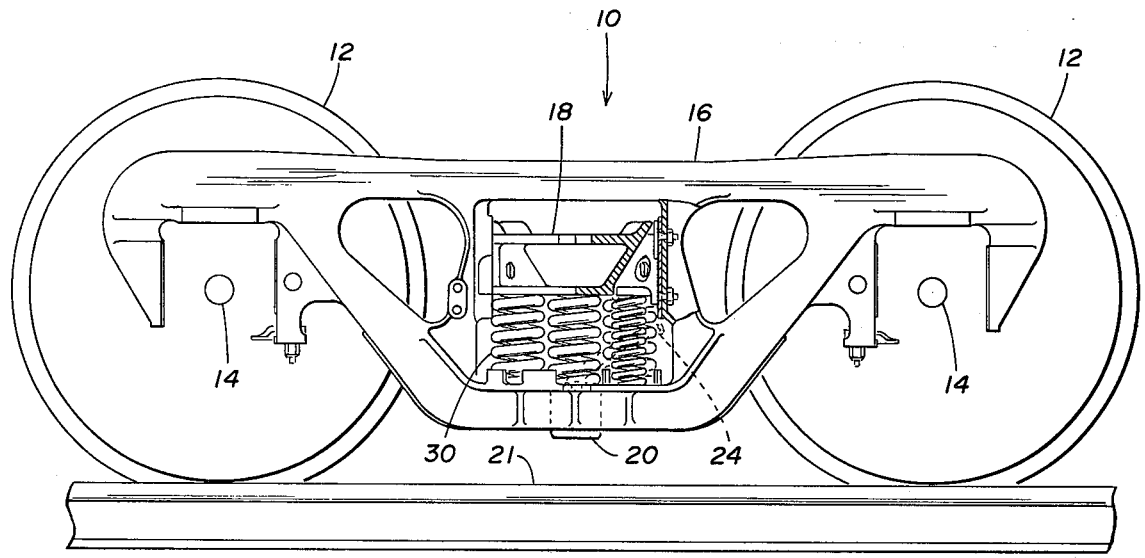

United States Patent [19]
Cope

[11] 3,938,765
[45] Feb. 17, 1976

[54] DERAILMENT DETECTOR

[75] Inventor: Geoffrey Wilton Cope, Williamsville, N.Y.

[73] Assignee: Dresser Industries, Inc., Dallas, Tex.

[22] Filed: Aug. 3, 1973

[21] Appl. No.: 385,384

Related U.S. Application Data

[63] Continuation of Ser. No. 162,609, July 14, 1971, abandoned.

[52] U.S. Cl. ................................ 246/172; 303/1
[51] Int. Cl.² ................... B60T 7/12; B61H 11/02
[58] Field of Search ............... 246/171, 172; 303/1

[56] References Cited
UNITED STATES PATENTS

| | | | |
|---|---|---|---|
| 493,661 | 3/1893 | Spearing | 246/172 |
| 493,662 | 3/1893 | Spearing | 246/172 |
| 1,234,712 | 7/1917 | Allen | 246/172 |
| 1,388,483 | 8/1921 | Rasnick et al. | 246/172 |
| 1,497,212 | 6/1924 | Hough et al. | 246/172 |
| 1,508,216 | 9/1924 | Campell | 246/172 |
| 1,559,809 | 11/1925 | Tonkinson | 246/172 X |

*Primary Examiner*—Duane A. Reger
*Attorney, Agent, or Firm*—Raymond T. Majesko; John N. Hazelwood

[57] ABSTRACT

A safety device for initiating an air brake application attached to or integral with the side frame of a railway car truck in proximity to the rail consisting of a hollow shoe or casting communicating with the air brake train line and adapted to make contact with the rail and fracture upon derailment venting the train line air to the atmosphere.

5 Claims, 2 Drawing Figures

U.S. Patent  Feb. 17, 1976  3,938,765

INVENTOR:
GEOFFREY W. COPE

ATTORNEYS

DERAILMENT DETECTOR

This is a continuation of application Ser. No. 162,609, filed July 14, 1971, now abandoned.

There has been a long need in the railroad industry for a means of detecting the derailment of a freight car and automatically initiating emergency braking procedures. The rash of serious mishappenings that have occurred in the last several years, sometimes reaching disaster proportions when tank cars carrying dangerous commodities have been involved, focused the attention of the Bureau of Safety on the causative factors and activated positive moves toward preventative measures.

One of the principal causes of these accidents is derailment of a railway car from broken wheels, broken wheel flanges, broken-off journals, broken truck components, a thin wheel flange splitting a switch, a severe rock-and-roll condition, severe truck nosing, severe truck restriction, poor or broken rails, frozen switches, obstacles on the track and many other possible abnormalities. There have been cases where a railway car has derailed and been hauled along the ties for as much as 25 miles before arriving at a switch or turnout and at that time causing a major wreck of the whole train. The detection of the derailment at its inception and an automatic application of the train's brakes would have prevented such a disaster.

It is known that reduction of air pressure in a railway brake air train line normally will initiate a brake application and cause the train to come to a stop. In the case of an entire car leaving the track and resulting in a train separation, the interconnecting air line couplings are parted, causing a quick release of air pressure, an emergency brake application and maximum retardation of the train, however, many derailments occur and the car concerned does not become displaced sufficiently to become uncoupled, therefore, the air train line hoses do not part and no brake application is made, hence the need for a derailment detector.

Certain devices have been proposed to provide a warning or apply the brakes. Exemplary are those disclosed in U.S. Pat. Nos. 1,200,339; 1,661,920 and a more recent issue, U.S. Pat. No. 3,535,511. The last mentioned patent discloses a device which consists of a base secured to a truck frame. The base contains an air duct which is connected by a hose to the air brake air line. A lever is pivotally connected to the base and extends across the railway car wheel for arrangement over the rails. The lever is held against movement about its pivot by a bolt which extends through the lever.

In operation, when a derailment occurs, the lever will engage the rail, breaking the interlock bolt and moving to a position such that the air duct becomes completely uncovered to permit air to escape and allow the brakes to be applied. With such a design, malfunctions could occur preventing the application of the brakes in a railway car derailment. An undetected flaw in the lever itself could cause a fracture of the lever without fracturing the bolt, thus leaving the air duct closed. Even a fracturing of the bolt as designed or a combination of a fracturing of the lever and the bolt could cause a possible jamming of a portion of the lever around the air duct, leaving it completely closed or partially closed. Distortion of the lever from contact with weeds or foreign bodies between the tracks could cause the lever to fail to contact the rail upon derailment. A build-up of rust, ice or other material could cause seizure of the lever and malfunction upon derailment.

Accordingly, it is an object of the invention to provide a substantially foolproof means for initiating a brake application upon the derailment of a railway car.

Another object is to provide a means for initiating a brake application upon the derailment of a railway car that will be impervious to all manner of usage and hazard except derailment.

Figure 2:
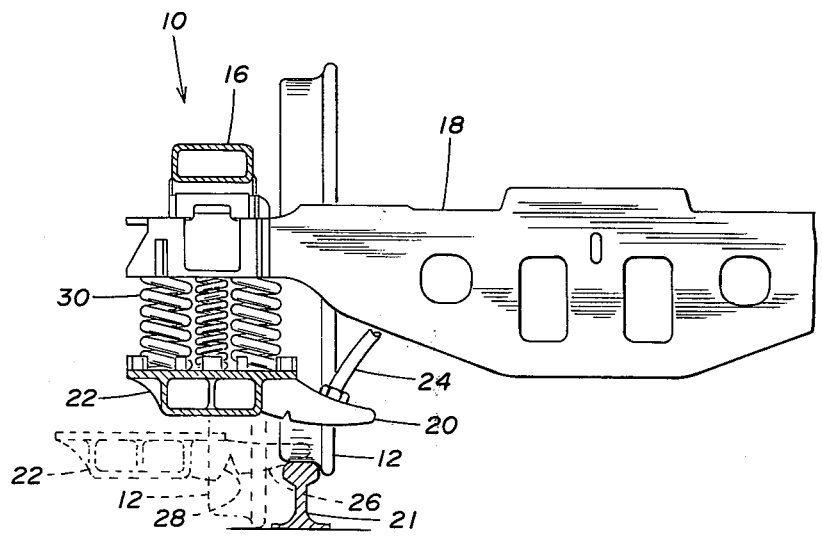

Other objects of the invention will become more apparent from the following detailed description and drawings in which:

FIG. 1 is a side elevation view of a railway car truck illustrating a preferred location of the device according to the present invention; and FIG. 2 is a partial front elevation view of a railway car truck illustrating a preferred embodiment of the present invention.

In accordance with the present invention, there is provided a safety device for initiating an air brake application on a railway car. The conventional railway car comprises, among other things, a body, two trucks each having a bolster and side frames and rotatably mounted wheels and an air brake system. The derailment detection device includes a metal shoe or casting having a cavity therewithin and a frangible portion. One end of the device is attached to the inside surface of the tension member of the side frame. The other end extends laterally toward the centerline of the truck and overlying the rail. Means connect the cavity in the casting to the air brake system. The casting is arranged to strike a rail and fracture upon derailment of a wheel, opening the cavity and venting air from the air brake train line to the atmosphere.

Referring to the drawings, a portion of a railway car truck 10 is shown in FIGS. 1 and 2. A railway car generally has a pair of these trucks disposed at the ends of the car. The trucks each consist of two sets of wheels 12 and axles 14, a pair of side frames 6 and a bolster 18 suitably connected and sprung to support the car body and permit the necessary articulation and rollability. The derailment safety device 20 is mounted on the tension member of the side frame substantially equidistant between the wheels on the inside of the truck. Thus, the device is disposed in close proximity to and overlying the rail 21.

The actual disposition of the device on the side frame is more clearly shown in FIG. 2. The device 20 which is simply a hollow metal shoe or casting is secured to the tension member 22 of the side frame 16 as by welding, bolting or the like. However, the device may be cast as an integral part of the side frame, if desired.

An air hose 24 or pipe communicates with a cavity 26 in the casting through a nipple and coupling connection. The other end of the air hose is connected to the railway car air brake train line (not shown) in a manner not to restrict or be strained by the truck movement relative to the car body. The device or casting contains at its lower end a frangible portion 28 in the form of a groove or other form of directionally oriented weakened section to assure fracture when required and to resist fracture from all loadings or impacts except those of the direction and magnitude caused by a derailment. The casting is designed to withstand all normal usage without fracture of the frangible portion, but fracture during derailment is assured. As shown in the lower segment of FIG. 2, when a wheel derails, the outer end of the casting strikes the rail which causes a fracture in the frangible portion of the casting. This would trigger an immediate exhaust of the train line air to the atmosphere and an emergency brake application. A less severe brake application could be produced if required or desirable.

For the sake of completion with regard to FIG. 2, the tension member 22 of the side frame 16 suspension springs 30 which, in turn, support the truck bolster 18 extending across to the other side frame which would be likewise equipped with a derailment detector.

Having thus described the invention in detail and with sufficient particularity as to enable those skilled in the art to practice it, what is desired to have protected by Letters Patent is set forth in the following claims.

The embodiments of the invention in which an exclusive property or privilege is claimed are defined as follows:

1. A safety device for initiating an air brake application on a railway car having conventional side frames with tension members which support suspension springs and rotatably mounted wheels and an air brake system, comprising a hollow metal shoe having a fracture groove on the lower side thereof, one end of the same shoe being attached to and extending laterally from an inside surface of the tension members of the side frames in close proximity and overlying the adjacent running rail, and means connecting the cavity in said shoe to the air brake train line, said shoe being arranged to strike the adjacent rail and fracture upon derailment of any wheel thereby opening said cavity and venting air from the brake train line to the atmosphere.

2. The device of claim 1 in which the shoe extends a substantial distance past the internal sides of the wheels.

3. The device of claim 1 in which the shoe is an integral part of the side frame.

4. The device of claim 1 in which the shoe is located on the lowermost portion of the side frame.

5. The device of claim 1 in which the shoe is disposed substantially centrally between the railway car wheels.

* * * * *